US011541825B2

(12) United States Patent
Brouwer

(10) Patent No.: US 11,541,825 B2
(45) Date of Patent: Jan. 3, 2023

(54) SYSTEM FOR PROVIDING COLOR BALANCE IN AUTOMOTIVE DISPLAY

(71) Applicant: Faraday & Future Inc., Gardena, CA (US)

(72) Inventor: Michael L. H. Brouwer, Los Gatos, CA (US)

(73) Assignee: Faraday&Future Inc., Gardena, CA (US)

(*) Notice: Subject to any disclaimer, the term of this patent is extended or adjusted under 35 U.S.C. 154(b) by 1070 days.

(21) Appl. No.: 16/097,611

(22) PCT Filed: Apr. 28, 2017

(86) PCT No.: PCT/US2017/030273
§ 371 (c)(1),
(2) Date: Oct. 29, 2018

(87) PCT Pub. No.: WO2017/190092
PCT Pub. Date: Nov. 2, 2018

(65) Prior Publication Data

US 2020/0324711 A1 Oct. 15, 2020

Related U.S. Application Data

(60) Provisional application No. 62/329,465, filed on Apr. 29, 2016.

(51) Int. Cl.
*B60R 11/02* (2006.01)
*B60K 35/00* (2006.01)
(Continued)

(52) U.S. Cl.
CPC .......... *B60R 11/02* (2013.01); *B60H 1/00742* (2013.01); *B60H 1/00778* (2013.01);
(Continued)

(58) Field of Classification Search
CPC .............. B60R 11/02; B60R 2300/402; B60H 1/00742; B60H 1/00778; B60K 35/00;
(Continued)

(56) References Cited

U.S. PATENT DOCUMENTS 8,384,537 B1 2/2013 Simmons
9,508,014 B2 * 11/2016 Lu .......................... B32B 17/10
(Continued)

FOREIGN PATENT DOCUMENTS

EP 1918876 B1 * 9/2013 ......... G06K 9/00805
JP 2010-288199 A 12/2010
(Continued)

OTHER PUBLICATIONS

Yoshihiro et al., "A Single Chip Image Processor for Various In-car Display Equipment," 2012, Publisher: IEEE.*
(Continued)

*Primary Examiner* — Tuan C To
(74) *Attorney, Agent, or Firm* — Veros Legal Solutions, LLP

(57) ABSTRACT

A display system may include a camera configured to capture an image of a calibration reference associated with an automobile, a display, and a controller in communication with the camera and the display. The controller may be configured to selectively adjust a color temperature of the display based on the image of the calibration reference.

17 Claims, 3 Drawing Sheets

(51) Int. Cl.
*B60W 40/02* (2006.01)
*B60H 1/00* (2006.01)
*B60W 50/14* (2020.01)
*G08B 25/01* (2006.01)

(52) U.S. Cl.
CPC ............. *B60K 35/00* (2013.01); *B60W 40/02* (2013.01); *B60K 2370/152* (2019.05); *B60K 2370/343* (2019.05); *B60K 2370/52* (2019.05); *B60R 2300/402* (2013.01); *B60W 2050/146* (2013.01); *G08B 25/016* (2013.01)

(58) Field of Classification Search
CPC ... B60K 40/02; B60K 2370/52; B60W 40/02; B60W 2050/146; G08B 25/016; G06T 7/80; G06T 7/0002
USPC .......................................................... 340/461
See application file for complete search history.

(56) References Cited

U.S. PATENT DOCUMENTS

2006/0279959 A1 12/2006 Yabashi et al.
2007/0139644 A1* 6/2007 Lekson ..................... G01J 3/51 356/218
2007/0285282 A1* 12/2007 Nakayama ............ H04N 7/181 348/E7.086
2010/0295670 A1* 11/2010 Sato ......................... B60Q 3/16 340/458
2011/0202240 A1* 8/2011 Rottner .................. B60Q 1/484 701/42
2011/0216194 A1* 9/2011 Kosaki ..................... H04N 7/18 348/148
2013/0250322 A1* 9/2013 Kawabata ........... H04N 1/6055 358/1.9
2014/0098229 A1* 4/2014 Lu ............................ B60R 1/00 348/148
2014/0247352 A1* 9/2014 Rathi .................. G06V 20/588 348/148
2014/0320658 A1* 10/2014 Pliefke ................ H04N 17/002 348/148
2014/0321701 A1* 10/2014 Halimeh ................ G06V 20/56 382/103
2014/0347486 A1* 11/2014 Okouneva ........... G06K 9/6201 348/148
2014/0350834 A1* 11/2014 Turk ......................... B60R 1/00 701/300
2015/0085124 A1 3/2015 Poppe et al.
2015/0254853 A1* 9/2015 Tanaka ...................... G06T 7/73 348/148
2016/0196098 A1* 7/2016 Roth ........................ G09G 5/00 715/761
2016/0307346 A1* 10/2016 Staudenmaier ......... G06T 11/60
2016/0350894 A1* 12/2016 Kosaki .................. G06T 3/4038

FOREIGN PATENT DOCUMENTS

JP 2014-130249 A 7/2014
JP 2015-231828 A 12/2015
WO WO-2008037473 A1 * 4/2008 ............... B60R 1/00
WO WO-2010144888 A2 * 12/2010 ............. G09G 3/006
WO WO-2015174383 A1 * 11/2015 ............. B60K 35/00

OTHER PUBLICATIONS

Folker et al., "A camera-based calibration for automotive augmented reality Head-Up-Displays," 2013, Publisher: IEEE.*
International Search Report dated Aug. 17, 2017 for International Application No. PCT/US2017/030273.

* cited by examiner

SYSTEM FOR PROVIDING COLOR BALANCE IN AUTOMOTIVE DISPLAY

CROSS-REFERENCE TO RELATED APPLICATIONS

The present application is a National Phase application under 35 U.S.C. § 371 of International Application No. PCT/US2017/030273, filed Apr. 28, 2017, which claims the benefit of U.S. Provisional Application No. 62/329,465, filed Apr. 29, 2016, the entirety of each of which is hereby incorporated by reference.

TECHNICAL FIELD

The present disclosure relates generally to a system, and more particularly, to a system for providing color balance in an automotive display.

BACKGROUND

Color balance (a.k.a., neutral balance, gray balance, or white balance) is the process of adjusting colors of an electronically captured image, such that the captured image appears to have the same colors viewed by a human eye. In particular, a scene may appear to the human eye to have different colors depending on the given lighting conditions. And in order for a camera to accurately capture an image of the scene, the camera must account for the given lighting conditions. This is commonly done by way of a calibration process, during which the camera is pointed at a gray card, a white card, or another neutrally colored object. This allows the camera to capture an image representative of the given lighting condition, which commercially available software can then use to adjust the color of future images taken by the same camera under the same lighting conditions.

Electronic displays may also appear different, depending on given lighting conditions. For example, the colors of an instrument cluster, a display screen, interior and/or exterior lighting, and other display devices associated with an automobile may have a different color temperature when the automobile is exposed to low-intensity light, high-intensity light, artificial light, natural light, diffused light, direct light, reflected light, etc. In most instances, these display devices are configured to display at fixed color temperatures, which have been previously determined by the automobile manufacturer to be optimally aesthetically pleasing to occupants of the automobile when exposed to a standard light source. However, when the automobile is exposed to a different light source, the corresponding color temperatures of the displays may appear less than optimally aesthetically pleasing to the occupants.

The disclosed control system is directed to mitigating or overcoming one or more of the problems set forth above and/or other problems in the prior art.

SUMMARY

One aspect of the present disclosure is directed to a display system for an automobile. The display system may include a camera configured to capture an image of a calibration reference associated with the automobile, a display, and a controller in communication with the camera and the display. The controller may be configured to selectively adjust a color temperature of the display based on the image of the calibration reference.

Another aspect of the present disclosure is directed to a method of controlling a display of an automobile. The method may include capturing an image of a calibration reference associated with the automobile. The method may also include selectively adjusting a color temperature of the display based on the image of the calibration reference.

Yet another aspect of the present disclosure is directed to an automobile. The automobile may include an instrument cluster located in a driver area of the automobile, and a display located in another area of the automobile. The automobile may also include a first camera configured to capture a first image of a first calibration reference in the driver area, a second camera configured to capture a second image of a second calibration reference in the other area, and a controller in communication with the instrument cluster, the display, the first camera, and the second camera. The controller may be configured to selectively adjust the color temperature of the instrument cluster based on the first image independent of adjustment of the color temperature of the display based on the second image.

DETAILED DESCRIPTION

The disclosure is generally directed to a system that may improve an appearance of an automobile display (e.g., an instrument cluster, an entertainment display, interior lighting, exterior lighting, etc.), as the display is viewed in varying lighting conditions. The system may detect an actual color temperature of a calibration reference; compare the actual color temperature to a desired color temperature; and selectively make adjustments to the display based on the comparison. In this exemplary way, the display may substantially maintain the desired appearance, regardless of changes to the lighting conditions.

Figure 1:
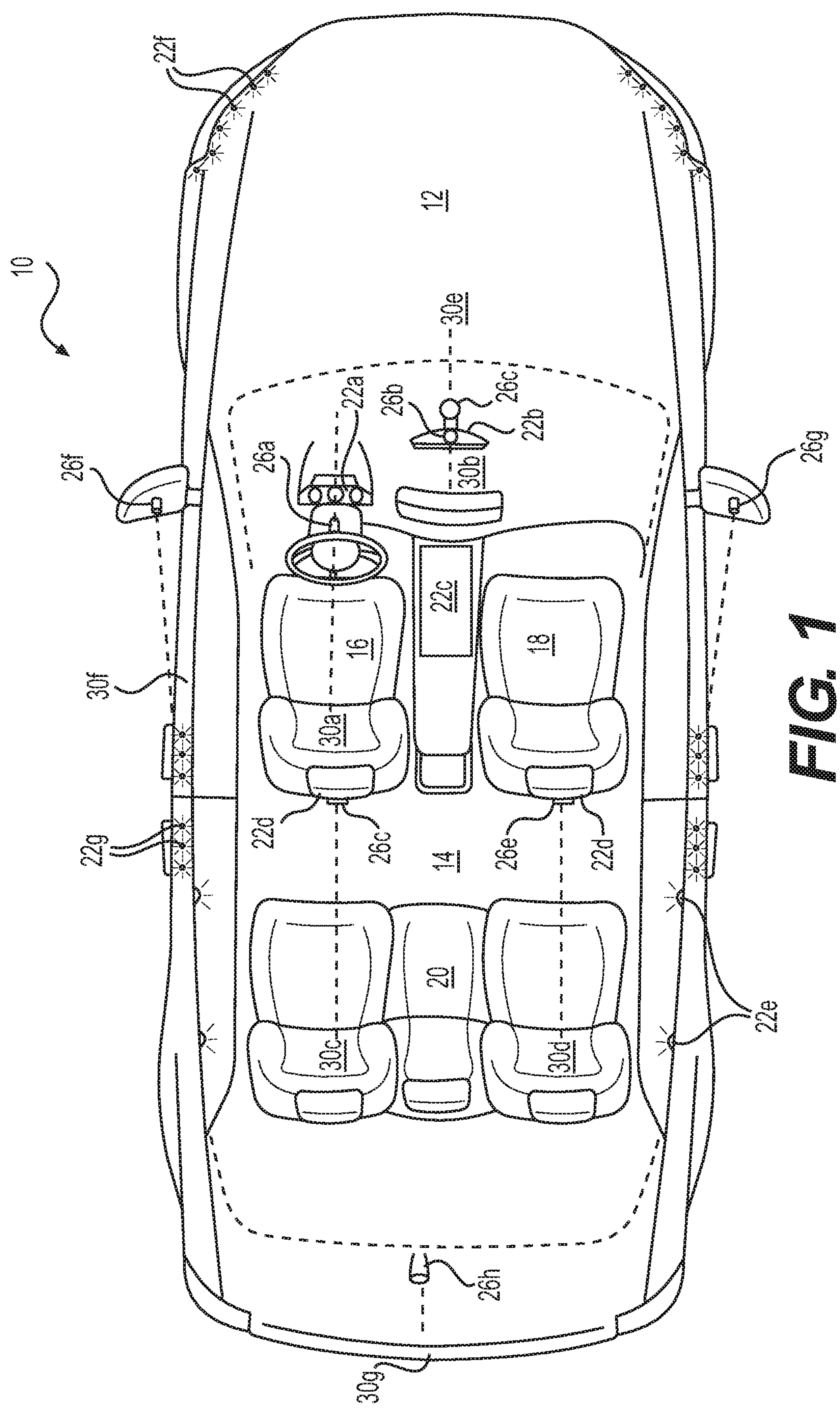
FIG. 1 is a top view illustration of an exemplary disclosed automobile.

FIG. 1 is a top view illustration of an exemplary automobile 10, with a roof portion thereof made transparent for purposes of clarity. Although automobile 10 is shown as a car in FIG. 1, it is contemplated that automobile 10 may alternatively be a pickup truck, a motorcycle, a utility vehicle, a van, or any other type of automobile. Automobile 10, as is known in the art, may be separated into different areas. For example, automobile 10 may have an exterior 12 and an interior 14. In addition, interior 14 may be divided into a driver area 16 and one or more passenger areas (e.g., a front-seat passenger area 18 and a rear-seat passenger area 20).

The different areas of automobile 10 may be furnished with any number and type of electronic displays 22. Display(s) 22 may generally function to provide electronic illumination of some kind within the respective areas. For example, each display may include one or more light emitting diodes (LEDs), liquid crystals, incandescent filaments, vacuum fluorescents, electroluminescents, cold cathodes, encapsulated plasmas, lasers, carbon nanotubes, Quantum dots, or other illuminating devices known in the art. These illuminating devices may be capable of independently or cooperatively generating visible light in one or more different colors and/or at different color temperatures that are specifically intended for the particular areas in which display(s) 22 are located.

For the purposes of this disclosure, the term "color temperature" may be defined as a characteristic of visible light that is expressed with a thermal unit of measure known as a Kelvin (° K). A given surface of automobile 10 (e.g., a surface of display 22) having a given color may reflect light with a higher or lower thermal unit, depending on its exposure to a particular light source (e.g., morning, midday, and evening sunlight; moonlight; florescent light; incandescent light; firelight; etc.). In some embodiments, this thermal unit may correlate with an appearance of the surface. For example, a given surface of automobile 10 may appear "cooler" or "warmer" at different times, depending on its color temperature.

As shown in FIG. 1, driver area 16 may be provided with at least a first display 22*a*. First display 22*a* may be, for example, an instrument cluster having one or more co-located instruments, which display performance information (e.g., speed, temperature, pressure, mileage, heading, transmission setting, battery power, etc.) associated with automobile 10. The instruments may be analog, digital, or a mix of analog and digital devices. At least one of the instruments within the cluster of first display 22*a* may be illuminated, and the illumination may be provided in one or more different colors and at variable levels of color temperature.

As further shown in FIG. 1, the other interior areas (e.g., front-seat passenger area 18, rear-seat passenger area 20, etc.) of automobile 10 may also be provided with at least a second display 22. Second display 22 may be, for example, a rear-view child and/or backup monitor 22*b*, a center console 22*c*, an entertainment display 22*d*, and/or cabin lighting 22*e*. Each of these devices may be illuminated, and the illumination may be provided in one or more different colors and at variable levels of color temperature.

Exterior 12 of automobile may also be provided with at least a third display 22, in some embodiments. Third display 22 may be, for example, exterior trim lighting 22*f* associated with the outward appearance of automobile 10 (i.e., lighting not associated with traffic, safety, or driving). Each of these devices may be illuminated, and the illumination may be provided in one or more different colors and at variable levels of color temperature.

Figure 2:
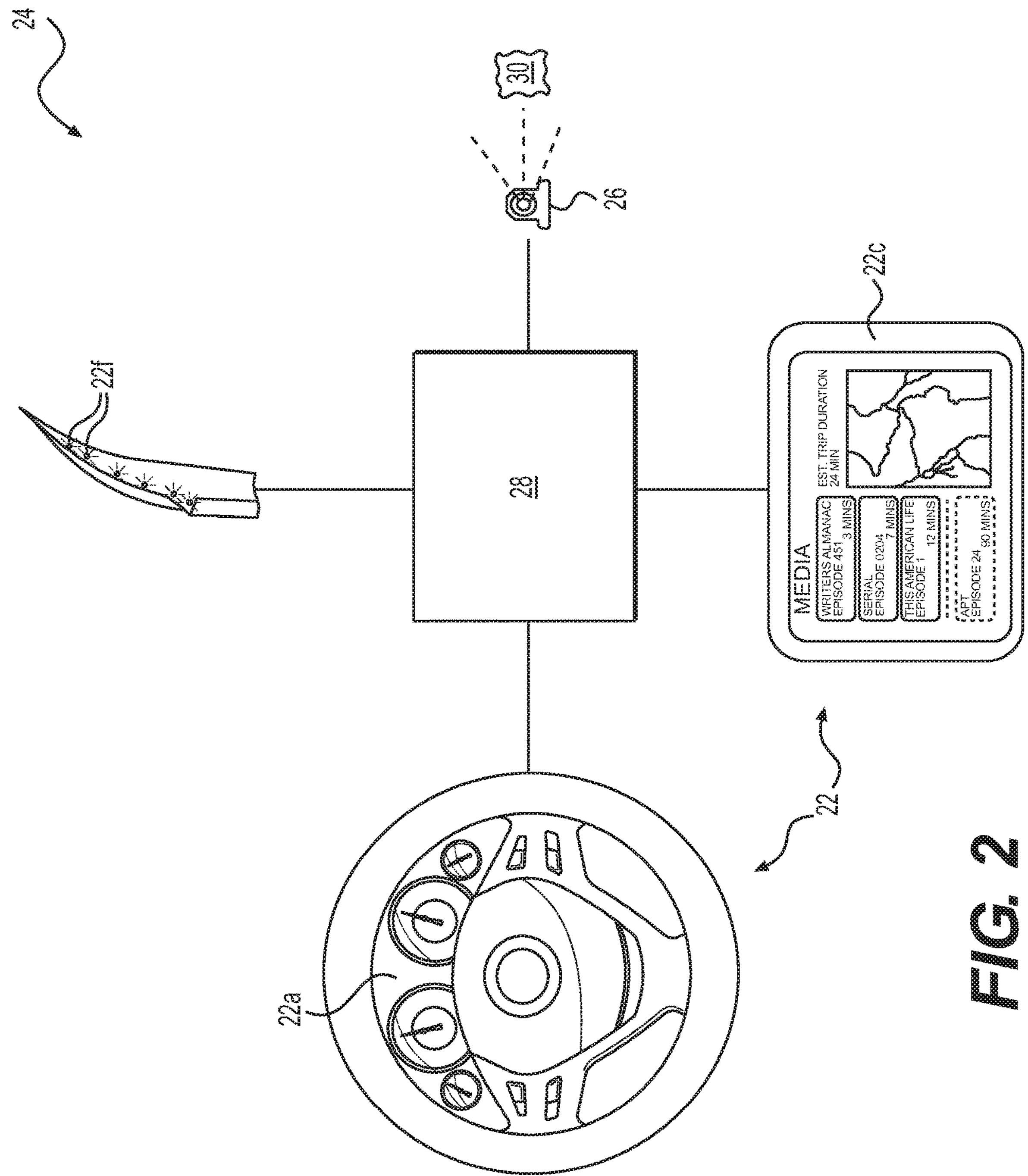
FIG. 2 is a diagrammatic illustration of an exemplary disclosed system that may be used in conjunction with the automobile of FIG. 1.

FIG. 2 is a diagrammatic illustration of an exemplary display system 24 that may be used in conjunction with automobile 10 of FIG. 1 to regulate the appearances of displays 22. Display system 24 may include, in addition to displays 22, at least one camera 26 and a controller 28 in communication with displays 22 and camera(s) 26. As will be explained in more detail below, camera(s) 26 may be configured to capture images of a calibration reference 30 indicative of current lighting conditions, and controller 28 may responsively use the images to make color temperature adjustments to displays 22.

Each camera 26 may be any digital type of camera known in the art, which is configured to capture an image of exterior 12 and/or interior 14 of automobile 10 and to generate corresponding digital signals directed to controller 28. Any number of cameras 26 may be included in display system 24 and located within any of the different areas. It is contemplated that one camera 26 may be provided in association with each display 22 for calibration purposes, or that images from a single camera 26 may be used to calibrate multiple displays 22 in the same or different areas. It is further contemplated that camera(s) 26 may be dedicated for calibration purposes only or that one or more of camera(s) 26 may be multi-functional.

In the example shown in FIG. 1, multiple cameras 26 are mounted to automobile 10 and used to calibrate multiple displays 22. For example, a first camera 26*a* is provided within driver area 16 (e.g., mounted within a dashboard, a steering wheel, or a rear-view mirror of automobile 10). At this location, first camera 26*a* may be configured to capture an image of a first calibration reference 30*a* that is also located within driver area 16. First calibration reference 30*a* may be, for example, a swatch of material that makes up a driver's seat, a seat belt, a headboard, a door panel, or the dashboard. In this example, signals generated by first camera 26*a* may be used to calibrate all displays 22, only display 22*a* located in driver area 16, or display 22*a* and also other nearby displays (e.g., display 22*b* and/or 22*c* located within front-seat passenger area 18). Additional cameras 26 (e.g., a second camera 26*b*, a third camera 26*c*, and a fourth camera 26*d*) may be associated with other interior areas of automobile 10 (e.g., with front- and/or rear-seat passenger areas 18, 20) to capture images of other calibration references 30*b* and 30*c* (e.g., swatches of other interior seat, floor, headboard, and/or door surfaces) for use in calibrating the co-located displays (e.g., displays 22*b*-22*e*). Similarly, one or more cameras 26 (e.g., a fifth camera 26*e*, a sixth camera 26*f*, and a seventh camera 26*g*) may be located externally and/or configured to capture images of external calibration references 30*e*, 30*f*, and 30*g* (e.g., swatches of a body panel, a hood, a bumper, a mirror housing, etc.). The images captured by these cameras 26 (i.e., by cameras 26*e*-26*g*) may be used to calibrate one or more of external displays 22*f* and 22*g*. It is contemplated that the images of the external calibration references 30 could alternatively or additionally be used to calibrate internal cameras 26 (and vice versa), if desired.

As described above any one or more of cameras 26 could be configured for multiple purposes (i.e., for a purpose in addition to a calibration purpose). For example, first camera 26*a*, in addition to capturing an image of calibration reference 30*a* within driver area 16, may also be used as a driver-fatigue camera that captures images of the driver. Similarly, camera 26*d* and/or 26*e*, in addition to capturing images of calibration references 30*b*-30*d*, may also be used as a child-monitor camera that captures images of rear-seat passengers. In a final example, cameras 26*e*-26*h*, in addition to capturing images of calibration references 30*e*-30*g*, may also be used as traffic-monitoring, backup, and/or lane-keeping cameras. Cameras 26 may also or alternatively be used for other purposes.

Controller 28 may embody a single processor or multiple processors that include a means for controlling an operation of display system 24. Numerous commercially available processors may perform the functions of controller 28. Controller 28 may include or be associated with a memory for storing data such as, for example, design preferences; performance characteristics or specifications of displays 22 and/or camera 26; operational instructions; and corresponding parameters of each area of automobile 10. Various other known circuits may be associated with controller 28, including power supply circuitry, signal-conditioning circuitry, solenoid driver circuitry, communication circuitry, and other appropriate circuitry. Moreover, controller 28 may be capable of communicating with other components of display system 24 via either wired or wireless transmission.

As described above, calibration references 30 may be used by system 24 to establish actual lighting conditions within corresponding areas of automobile 10. Each of these references 30 may have a known color and, under a particular or standard lighting condition (e.g., an average lighting condition expected in most applications of automobile 10), a known color temperature. In some embodiments, each reference 30 has a color (e.g., red, green, yellow, brown, etc.) and/or a color temperature that is different and corresponds with an intended aesthetic appearance of the associated area. For example, in one instance the swatch of the driver's seat used as calibration reference 30*a* may be tan and "warmer" to match a first trim option of automobile 10, but in another example black and "cooler" to match a second trim option. In other embodiments, however, all references 30 may have a predefined color (e.g., white or gray) and/or a predefined color temperature most suited to calibration of displays 22, regardless of the trim option selected for automobile 10. For example, even though the driver's seat may be tan or black, a small portion (e.g., a tag, a seam, or another portion) of all seats that is captured in the calibration image by camera 26*a* may be gray or white and have a predefined color temperature.

Figure 3:
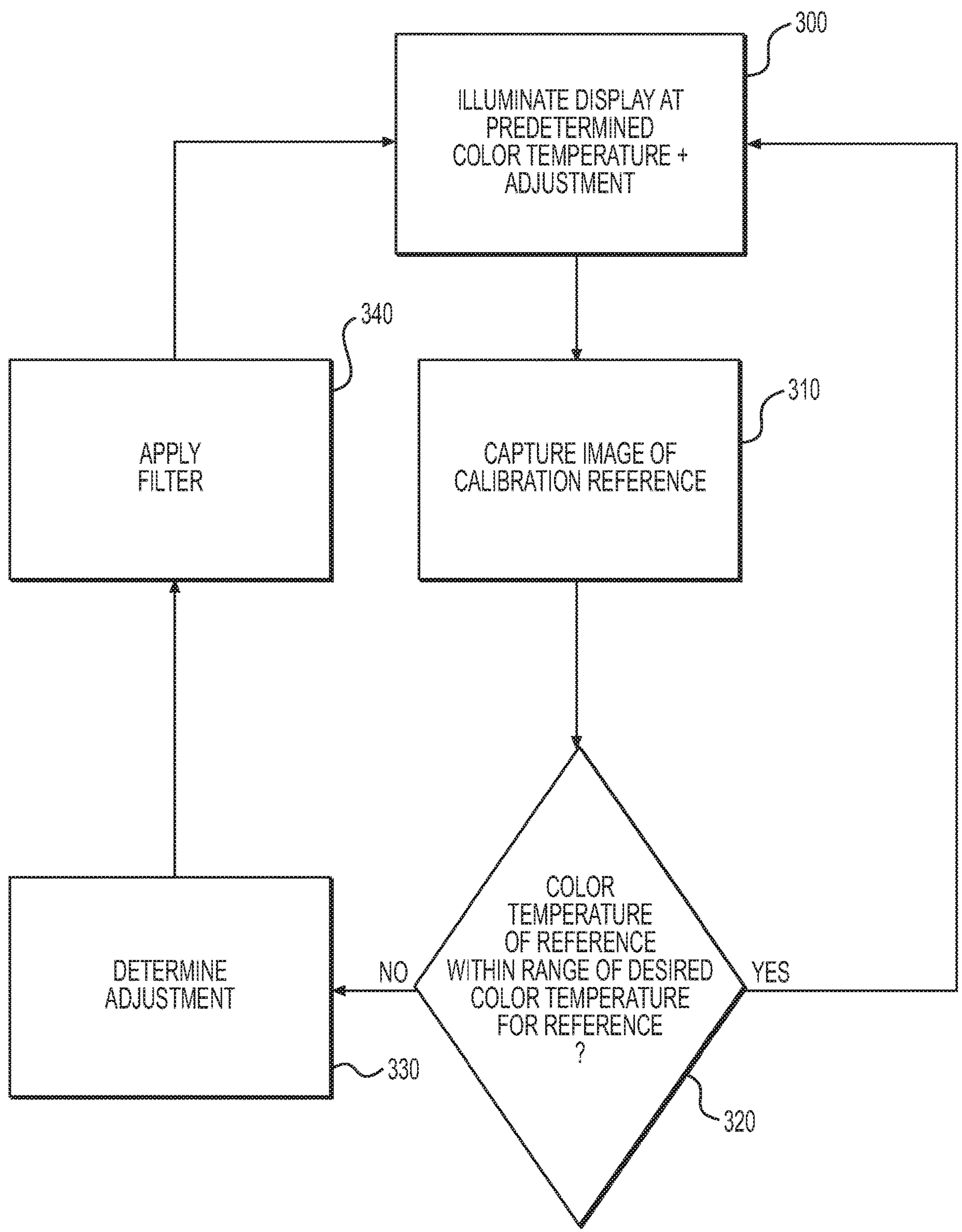
FIG. 3 is a flowchart illustrating an exemplary process that may be performed by the system of FIG. 2.

FIG. 3 provides a flowchart illustrating an exemplary method of control that may be performed by exemplary display system 24 of FIG. 2. As shown in this flowchart, the method may begin with illumination of displays 22 at predetermined color temperatures (Step 300). In particular, controller 28 may be programmed to have default settings, such that an actual lighting condition matches a standard lighting condition for which displays 22 are factory-calibrated. When displays 22 are exposed to the standard lighting condition, color temperatures of displays 22 may be at levels designed to be most aesthetically pleasing to occupants and/or passersby. It should be noted that these color temperatures may be different for different areas of automobile 10, different for different displays 22, and/or different depending on the trim options selected for automobile 10. As actual lighting conditions at displays 22 deviate from the standard lighting conditions, the color temperatures of displays 22 (and/or surrounding surfaces of automobile 10) may likewise deviate from desired levels.

In order for displays 22 (and the surrounding surfaces) to maintain the designed color temperatures, controller 28 may activate cameras 26 to capture images of calibration references 30 that are indicative of actual lighting conditions (Step 310). It is contemplated that the capturing of calibration reference images may be performed continuously or periodically, as desired. It is also contemplated that the frequency of image capturing could be influenced by the multi-use functionality of cameras 26. For example, some cameras 26 may already be configured to capture images continuously or periodically for other purposes (e.g., for driver fatigue detection, for lane-keeping, for child monitoring, etc.). In some instances, controller 28 may use the same images captured for these other uses at the given frequency that they are already being captured. In other instances, however, controller 28 may cause cameras 26 to capture additional images at an increased frequency. Signals corresponding to the images captured by cameras 26 may be directed to controller 28 for processing.

Controller 28 may digitally receive the images of calibration references 30 that are captured by cameras 26, and compare actual color temperatures of references 30 exhibited in the images to the designed color temperatures to determine if the actual color temperatures are within an acceptable range of the designed color temperatures (Step 320). For example, calibration reference 30*a* may be known to have a desired color temperature of about 6,500° K when exposed to the standard lighting condition provided during factory calibration of display 22*a*. However, during sunset conditions on a particularly overcast day, the actual color temperature exhibited in the captured image of the same calibration reference 30*a* may be only 5,000° K. In this example, the actual color temperature of calibration reference 30*a* may be about 1,500° K below the desired color temperature. This same temperature difference may be assumed to correspond with other surfaces in the same general area (e.g., surfaces of displays 22 and/or surfaces receiving light from displays 22). In some embodiments, any difference between the actual and designed color temperatures may be undesirable. In other instances, only significant differences may be undesirable. In these instances, the acceptable range may be about 500° K. As long as the difference between the actual color temperature and the designed color temperature for the particular calibration reference 30 is less than the acceptable range (Step 320: Y), control may return from step 320 to step 300.

However, when the difference between the actual color temperature and the designed color temperature for a particular calibration reference is greater than the acceptable range (Step 320: N), controller 28 may be configured to determine a corresponding adjustment to the associated display 22 (Step 330). Color temperature adjusting of electronic displays is a commonly known technology, and any commercially available software may be used for this purpose. The color temperature of the associated display 22 (e.g., display 22*a*) may be adjusted as a factor of the difference described above using any known algorithm.

In some instances, it may be undesirable to apply the full adjustment determined at step 300 to a particular display 22. For example, in some instances, the adjustment may correspond with a temporary lighting condition that produces an extreme difference between the actual and desired color temperatures of a particular display 22. In these instances, applying the full adjustment determined at step 330, followed by another extreme adjustment corresponding to a return to normal lighting conditions, could appear as flashing or pulsing of display 22. This may be undesired in some applications. In another example, the adjustment of one display 22 could be a significant step change and/or significantly different than a similar adjustment made to another nearby display 22. In either situation, the adjustment could be noticeable by the occupants of automobile 10, which may also be undesirable. In these instances, controller 28 may be configured to selectively filter the adjustment before applying the adjustment (Step 340). For example, controller 28 may apply a time-change filter that limits an amount of adjustment that can be made within a specified period of time. In another example, controller 28 may apply an averaging filter, which averages adjustments made to adjacent displays 22, such that both displays 22 have a similar appearance and/or appear to adjust by about the same amounts within a given period of time.

It will be apparent to those skilled in the art that various modifications and variations can be made to the disclosed control system and related method. Other embodiments will be apparent to those skilled in the art from consideration of the specification and practice of the disclosed control system and related method. It is intended that the specification and examples be considered as exemplary only, with a true scope being indicated by the following claims and their equivalents.

What is claimed is:

1. A display system for an automobile, comprising:

a camera configured to capture an image of a calibration reference associated with the automobile;

a display; and a controller in communication with the camera and the display, the controller being configured to selectively adjust a color temperature of the display based on the image of the calibration reference;

wherein: the camera is a first camera directed to a first area of the automobile to capture a first image;

the display is a first display located in the first area of the automobile;

the display system further includes: a second camera directed to a second area of the automobile to capture a second image; and a second display located in the second area of the automobile; and the controller is configured to adjust the color temperature of the first display based on the first image independent of adjustment of the color temperature of the second display based on the second image.

2. The display system of claim 1, wherein: the camera is directed toward a driver location inside the automobile; and the display includes an instrument cluster mounted inside a driver area of the automobile.

3. The display system of claim 2, wherein the camera is a driver-fatigue camera.

4. The display system of claim 1, wherein: the camera is directed toward a rear-seat passenger area inside the automobile; and the display includes an entertainment display mounted in the rear-seat passenger area of the automobile.

5. The display system of claim 4, wherein the camera is a child monitor camera.

6. The display system of claim 1, wherein the display includes cabin lighting.

7. The display system of claim 1, wherein: the camera is directed toward an exterior of the automobile; and the display includes an exterior trim light.

8. The display system of claim 7, wherein the camera is one of a traffic monitoring camera and a backup camera.

9. The display system of claim 1, wherein the controller is configured to apply a filter to adjustments made to the image.

10. The display system of claim 9, wherein the filter is one of a rate of adjustment filter or an averaging filter.

11. The display system of claim 1, wherein: the calibration reference has a known color temperature under calibration lighting; and the controller is configured to adjust the color temperature of the display based on a difference between a detected color temperature of the image and the known color temperature.

12. The display system of claim 11, wherein the calibration reference is one of a seat, an interior door panel, an exterior body panel, or a bumper of the automobile.

13. A method of controlling a display of an automobile, comprising:

capturing an image of a calibration reference associated with the automobile; and selectively adjusting a color temperature of the display based on the image of the calibration reference;

wherein: capturing the image of the calibration reference includes capturing a first image of a first calibration reference in a first area of the automobile;

the method further includes capturing a second image of a second calibration reference in a second area of the automobile; and selectively adjusting the color temperature includes selectively adjusting the color temperature of a first display based on the first image independent of adjusting the color temperature of a second display based on the second image.

14. The method of claim 13, wherein:

capturing the image of the calibration reference includes capturing an image of a driver location inside the automobile; and the display includes an instrument cluster mounted inside a driver area of the automobile.

15. The method of claim 13, wherein:

capturing the image of the calibration reference includes capturing an image of a rear-seat passenger location of the automobile; and the display includes an entertainment display mounted in a rear-seat area of the automobile.

16. The method of claim 13, wherein: capturing the image of the calibration reference includes capturing an image of an exterior of the automobile; and the display includes an exterior trim light.

17. The method of claim 13, further including filtering adjustments to be made to the color temperature of the display based on at least one of a rate of adjustment and an average of color temperatures.

* * * * *